(12) United States Patent
Maier

(10) Patent No.: US 9,856,925 B2
(45) Date of Patent: Jan. 2, 2018

(54) DUAL-MASS FLYWHEEL WITH INTEGRATED FREEWHEELING MECHANISM

(71) Applicant: Schaeffler Technologies AG & Co. KG, Herzogenaurach (DE)

(72) Inventor: Christoph Maier, Buehl (DE)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/040,468

(22) Filed: Feb. 10, 2016

(65) Prior Publication Data

US 2016/0230836 A1  Aug. 11, 2016

(30) Foreign Application Priority Data

Feb. 10, 2015 (DE) .......... 10 2015 202 334

(51) Int. Cl.

| | |
|---|---|
| *F16D 41/04* | (2006.01) |
| *F16F 15/131* | (2006.01) |
| *B60K 6/00* | (2006.01) |
| *F16D 3/12* | (2006.01) |
| *B60K 17/02* | (2006.01) |
| *F16D 13/38* | (2006.01) |
| *F16D 13/70* | (2006.01) |
| *F16D 41/00* | (2006.01) |

(52) U.S. Cl.
CPC ............... *F16D 41/00* (2013.01); *B60K 6/00* (2013.01); *B60K 17/02* (2013.01); *F16D 3/12* (2013.01); *F16D 13/38* (2013.01); *F16F 15/13121* (2013.01); *F16D 41/04* (2013.01); *F16D 2013/703* (2013.01)

(58) Field of Classification Search
CPC ................................................. F16F 15/13121
See application file for complete search history.

(56) References Cited

U.S. PATENT DOCUMENTS

| | | | | |
|---|---|---|---|---|
| 8,920,275 | B2 | 12/2014 | Reitz et al. | |
| 2010/0314185 | A1* | 12/2010 | Schoenek | B60K 6/36 180/65.7 |
| 2014/0094341 | A1* | 4/2014 | Ruder | B60K 6/383 477/5 |

FOREIGN PATENT DOCUMENTS

| | | |
|---|---|---|
| DE | 1074986 | 2/1960 |
| DE | 102011087334 | 6/2012 |
| WO | WO2012/167767 | * 12/2012 |

* cited by examiner

*Primary Examiner* — Mark A Manley
(74) *Attorney, Agent, or Firm* — Davidson, Davidson & Kappel, LLC

(57) ABSTRACT

A torque transfer device (1) for a drivetrain (2) of a motor vehicle, having a torsional vibration damping unit (3) and a decoupling clutch (6) having at least two clutch elements (4, 5) which can be joined to each other, wherein a first clutch element (4) is permanently connected non-rotatingly to a flange section (7) of the torsional vibration damping unit (3) and a second clutch element (5) is coupled with the flange section (7) via a freewheeling unit (8), wherein at least some sections of the freewheeling unit (8) are positioned in a radial receiving space (9) of the torsional vibration damping unit (3).

16 Claims, 2 Drawing Sheets

DUAL-MASS FLYWHEEL WITH INTEGRATED FREEWHEELING MECHANISM

This claims the benefit of German Patent Application DE102015202334.6, filed Feb. 10, 2015 and hereby incorporated by reference herein.

BACKGROUND

The invention relates to a torque transfer device, which is also known as a freewheeling decoupling clutch, for a drivetrain of a motor vehicle, such as a passenger car, truck, bus or agricultural utility vehicle, having a torsional vibration damping unit and a decoupling clutch having at least two clutch elements that are connectable to each other, wherein a first clutch element of the decoupling clutch is permanently connected non-rotatingly to a flange section of the torsional vibration damping unit and a second clutch element of the decoupling clutch is coupled to and works together with the flange section by means of a freewheeling mechanism. In particular, this torque transfer device is intended for use in a hybrid drivetrain of a motor vehicle.

Torque transfer devices of this design are known already from the existing art. DE 10 2011 087 334 A1 discloses in this connection, for example, a hybrid module for a drivetrain of a motor vehicle having an internal combustion engine and a transmission, where the hybrid module operates between the internal combustion engine and the transmission and has an electric drive, a decoupling clutch and a freewheeling mechanism. The decoupling clutch and the freewheeling mechanism are provided parallel to each other, each of them transmit torque from the internal combustion engine in the direction of the transmission. The freewheeling mechanism transmits torque coming from the internal combustion engine in the direction of the transmission, and disengages when there is torque in the opposite direction. A portion of the torque generated by the internal combustion engine, which is transmitted by the freewheeling mechanism, can be adjusted to set a torque transmissible by the decoupling clutch, so that the vehicle can optionally be propelled by the internal combustion engine or the electric drive or simultaneously by both of them combined.

In other words, hybrid systems are already known from the prior art in which the electric machine/electric motor is positioned behind the internal combustion engine and in front of the transmission. The separating element (decoupling clutch), which optionally connects the internal combustion engine to the power train/drivetrain, is supposed on the one hand to transmit the traction and drag torques of the internal combustion engine, on the other hand to enable compression-starting the internal combustion engine when starting the engine from electric driving mode.

Moreover, conventional friction clutches are also known which are designed for maximum engine torques. In most cases, these systems then have an additional starter for the internal combustion engine.

SUMMARY OF THE INVENTION

It has turned out to be disadvantageous in these cases that the known torque transfer devices frequently require a relatively large axial and radial construction space. In particular, in most cases these construction spaces are even substantially larger than those of conventional friction clutches coupled with dual-mass flywheels, which are employed in drivetrains that are driven exclusively by an internal combustion engine.

It is an object of the present invention to provide a torque transfer device for a hybrid drive which is especially short in the axial direction.

The present invention provides to position the freewheeling unit at least partially in a radial receiving space of the torsional vibration damping unit.

By arranging the freewheeling unit (also referred to as a freewheeling mechanism) in this position, construction space can clearly be saved. The freewheeling unit is consequently integrated into the torsional vibration damping unit. Since the axial length of the freewheeling unit has certain limits, due to the mechanical design, and thus must be designed at a minimum, a very clever nesting of torsional vibration damping unit and freewheeling unit is implemented as a result. Thus, the axial construction space of the entire torque transfer device is significantly shortened. Consequently, a clutch system in the form of the torque transfer device is implemented, which is able to transmit the maximum torques of the internal combustion engine, for example a gasoline or diesel engine, and at the same time is of short construction (minimum axial space requirement). In this case, the torsional vibration damping unit is preferably inserted between the clutch system and the internal combustion engine. As a result, a decoupling clutch is present which enables the internal construction engine to be started from driving mode; that is, the internal combustion engine can be compression-started by means of the decoupling clutch/separating element. Torque fluctuations during the compression-starting process are thereby preferably compensated for by the electric machine. A driving-off procedure using the clutch system is not provided here, however.

Additional advantageous embodiments are explained in greater detail below.

In this case, the second clutch element is preferably coupled with the flange section by means of the freewheeling unit in such a way that when the freewheeling unit is in a locked position the second clutch element and the flange section are connected non-rotatingly with each other, and when the freewheeling unit is in an unlocked position they are arranged so that they are rotatable independently of each other.

If the torsional vibration damping unit (also referred to as a damping device/damping unit) is in the form of a dual-mass flywheel, the saving of the axial construction length is used especially effectively, since there is usually a relatively certain receiving space present radially within the dual-mass flywheel.

If the flange section is in the further part of a secondary flywheel of this dual-mass flywheel, the torque transfer unit is also made up of the fewest possible components.

It is also advantageous if a radial outer ring of the freewheeling unit is attached/fastened non-rotatingly to the flange section and/or the first clutch element. Alternatively, another version also contains the implementation that the outer ring and the flange section are designed integrally/all in one piece, i.e., as a single piece of material. As a result, linking of the freewheeling unit is also realized especially directly.

In this connection, it is also beneficial if a radial inner ring of the freewheeling unit, which is preferably located radially inside of the outer ring, is connected non-rotatingly to the second clutch element by means of a shaft section which extends out of the torsional vibration damping unit in the axial direction. The second clutch element is thus positioned spaced apart from/adjacent to the torsional vibration damping unit in the axial direction. An especially direct transmission of power is realized thereby.

It is also beneficial here if the outer ring is supported radially, i.e., in the radial direction relative to the inner ring by means of a roller bearing (rotatably). The support of the outer ring is realized reliably thereby, while at the same time the flange section/secondary flywheel is also supported in the radial direction.

In addition, the shaft section is expediently connected non-rotatingly to a transmission input shaft of a transmission, or is even designed as an integral—i.e., materially single-piece—component of the transmission input shaft. The transfer of torque is realized especially directly thereby.

If the first clutch element is designed as a pressure plate of the decoupling clutch which forms an inertial mass, the form of the decoupling clutch is executed even more compactly.

In this connection, it is also expedient if the second clutch element is then designed as a clutch plate, which makes the form of the decoupling clutch even more compact.

In addition, it is beneficial if the first clutch element extends in the axial direction to a point of connection with the flange section, into the torsional vibration damping unit, namely into a housing of the torsional vibration damping unit. This moves the decoupling clutch especially close to the torsional vibration damping unit.

In addition, it is also beneficial if the decoupling clutch is designed as a normally engaged or a normally disengaged clutch, preferably in the form of a friction clutch. This makes the friction clutch especially efficient and durable.

Furthermore, it is also beneficial if the decoupling clutch/friction clutch is engaged when the internal combustion engine starts. In this case, the torque transfer unit is designed in such a way that it can be driven by an electric motor located either between the decoupling clutch and the transmission, in the transmission, between the transmission and a torque distributing device (preferably a differential), at an end area of a drive shaft facing the torque distributing device between the differential and a drive wheel of the motor vehicle or at an end area of the drive shaft facing the drive wheel between the torque distributing device and the drive wheel of the motor vehicle. The freewheeling mechanism/unit serves purely to transmit the traction torques of the internal combustion engine; the decoupling clutch serves to transmit the drag torques of the internal combustion engine and also to start the engine by means of the electric motor. This makes the torque transfer device especially efficient.

In other words, in this way a torque transfer device is configured in the form of a freewheel decoupling clutch which has a clutch and a freewheeling mechanism connected in parallel, where the clutch is designed both for normally open (normally disengaged) and normally closed (normally engaged) clutches. In particular, the integration of the freewheeling mechanism/freewheeling unit into the torsional vibration damping unit/DMF (dual-mass flywheel) is beneficial specifically in combination with the type of integration of the freewheel decoupling clutch.

The clutch system therefore consists of two clutch elements which undertake different tasks. The first clutch element is a decoupling clutch preferably designed as a friction clutch, which may be designed both as "normally open" (disengaged when non-powered) and as "normally closed" (engaged when non-powered). This friction clutch serves to realize compression starting of the engine/internal combustion engine, and to transmit the drag torques of the engine (for example, for operation as an engine brake). As a rule, these torques are significantly lower than the maximum engine torque in traction mode. This enables this friction clutch to be dimensioned correspondingly smaller. The friction clutch is actuated through a bearing, using an actuator. The second clutch element is a freewheeling mechanism (freewheeling unit). This freewheeling mechanism is employed in such a way that it is only able to transmit traction torques of the internal combustion engine. When the internal combustion engine is stopped, the freewheeling mechanism is overtaken by the rest of the drivetrain and is free. When the internal combustion engine is running, it can transmit traction torques through the freewheeling mechanism to the drivetrain. An advantage of this solution is the space-saving construction. Compared to other systems, the friction clutch can be designed radially smaller and thus also more compact radially. That is, the system can offer advantages when construction space is limited radially. While the (small) friction clutch is conventionally connected to the secondary side of the dual-mass flywheel, the freewheeling mechanism is positioned within the dual-mass flywheel and is likewise connected to the secondary side of the DMF. Another advantage is the normally smaller mass moment of inertia and thus the mass that must be accelerated during compression starting, since the freewheeling mechanism is positioned at a smaller diameter within the DMF and the friction clutch is smaller in comparison to a clutch that has to transmit the high traction torques. Additional advantages can be found in the resolution of moments and the simple torque design (possibly dispensing with wear adjustment mechanisms and pad springing). Furthermore, yet another advantage is that at a lower actuating energy of the friction clutch where the friction diameter is the same, a friction clutch having lesser moment demands requires smaller actuating forces.

BRIEF DESCRIPTION OF THE DRAWINGS

The invention will now be explained in greater detail below on the basis of figures, which also describe various exemplary embodiments.

The figures show the following.

DETAILED DESCRIPTION

The figures are merely schematic in nature, and serve to aid in understanding the invention. The same elements are provided with the same reference labels.

Figure 1:
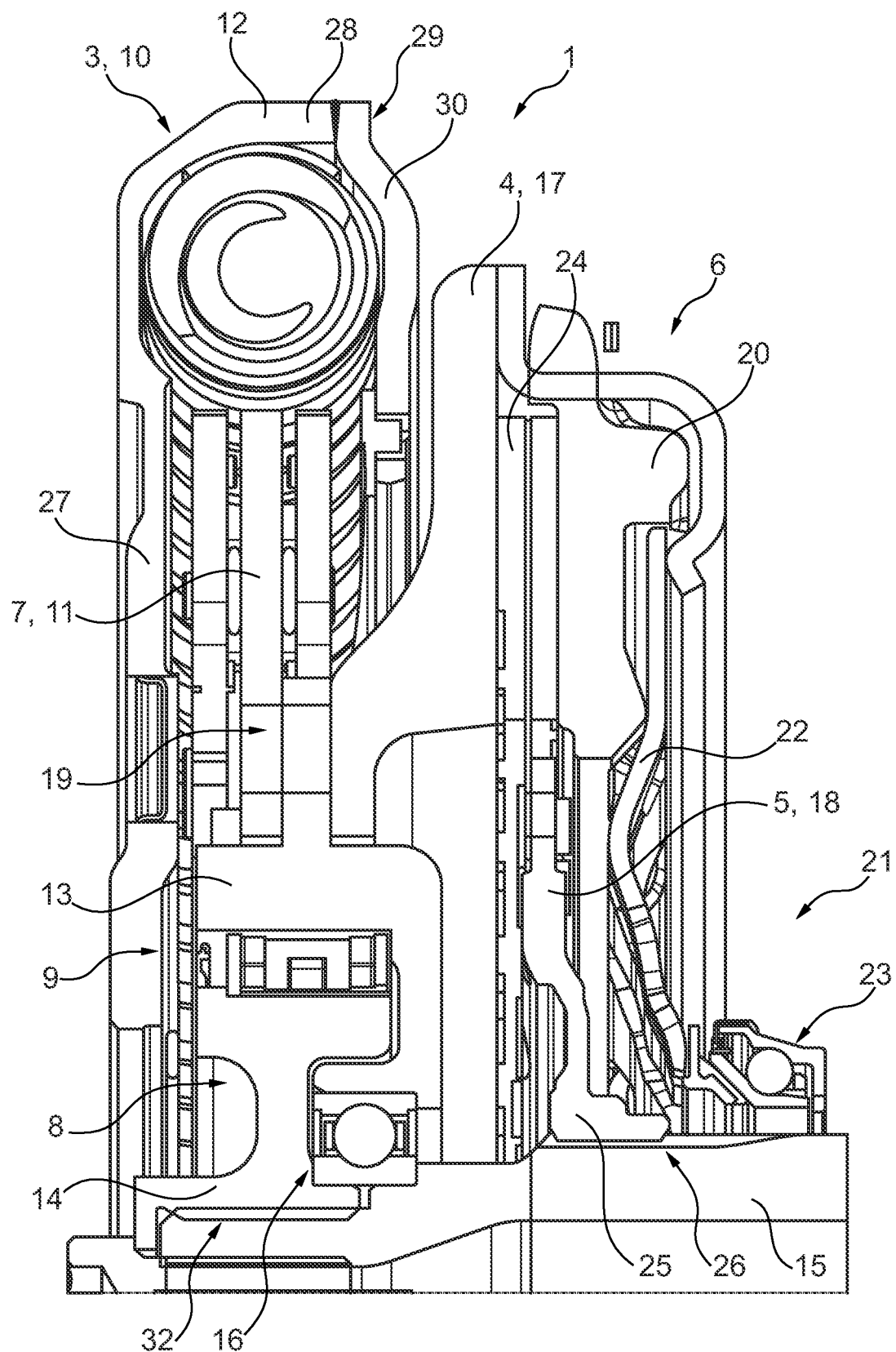
FIG. 1 a longitudinal sectional view of a torque transfer device according to the invention, according to a first preferred exemplary embodiment, in which the arrangement of the freewheeling unit within the torsional vibration damping unit can be seen especially well, and FIG. 2 a schematic depiction of a drivetrain having such a torque transfer device according to FIG. 1, in which the various possible positions of the electric motor employed in addition to the internal combustion engine can be seen.

FIG. 1 shows the torque transfer device 1 according to the invention especially clearly; it is made up as a module, i.e., in modular construction, of a torsional vibration damper unit 3 and a decoupling clutch 6. The torque transfer device 1 is designed for a drivetrain 2 of a motor vehicle, which will be explained in greater detail below in connection with FIG. 2, and is also employed therein in operation. The torque transfer device 1 thus has the torsional vibration damper unit 3 and the decoupling clutch 6, where the decoupling clutch 6 has clutch elements 4, 5 that can be connected with each other, and a first clutch element 4 is permanently connected to a flange section 7 of the torsional vibration damper unit 3 and a second clutch element 5 is coupled with the flange section 7 by means of a freewheeling unit 8.

As can be seen immediately when examining the decoupling clutch 6, the latter is designed as a single plate clutch, namely a single plate friction clutch. This decoupling clutch 6, also referred to as a friction clutch, has—besides the first clutch element 4 and the second clutch element 5—a clamping plate 20 which is movable, namely axially movable, in the axial direction relative to the two clutch elements 4 and 5. Depending on the axial position of this pressure plate 20, the decoupling clutch 6 is thus either in a coupled position or in a decoupled position. When it is in this coupled position the pressure plate 20 presses the second clutch element 5 against the first clutch element 4 in a frictional lock and thus joins these two clutch elements 4, 5 non-rotatingly (i.e., the clamping plate 20 presses the clutch plate 18 against the counter plate/pressure plate 17, the torque is transmitted by means of friction from the counter plate 17 and the clamping plate 20 (which is joined non-rotatingly with the counter plate 17 by means of leaf springs) to the clutch plate 5 (or vice versa in coasting mode)). When it is arranged in an uncoupled position, the first clutch element 4 and the second clutch element 5 are spaced apart from each other, or at least are positioned so that no torque is transmitted between these two clutch elements 4, 5.

An actuating device 21 is provided to move the clamping plate 20 between the first axial position, assigned to the coupled position, and the second axial position of the clamping plate 20, assigned to the uncoupled position. Besides a lever element 22, which has the form of a diaphragm spring and is in contact with the clamping plate 20, this actuating device 21 has an actuating bearing 23. Furthermore, the actuating bearing 23 is movement-coupled in the axial direction with an actuating system, which is not shown here in the interest of clarity. The actuating bearing 23 is an engaging bearing in this design, since the decoupling clutch 6 is a normally disengaged clutch. In another version, the decoupling clutch 6 is a normally engaged clutch and the actuating bearing is a clutch release bearing. By moving the actuating bearing 23 axially, an area of the lever element 22 in contact with the clamping plate 20 is displaced, which causes the clamping plate 20 to be moved between its two (first and second) axial positions.

It can also be seen that the second clutch element 5 is in the form of a clutch plate 18. This clutch plate 18 has, on a radially outer area, a friction lining 24, which, at least in the coupled position, is friction-locked in the axial direction against the opposing surfaces of the first clutch element 4 and the clamping plate 20. This friction lining 24 is non-rotatingly attached on a radial inner side to a connecting section 25, which connecting section 25 in turn is non-rotatingly attached by means of spline toothing/axial toothing to a shaft section 15, but is supported so that it is movable axially in relation to the shaft section 15. The second clutch element 5 is thus connected non-rotatingly to the shaft section 15 by means of spline toothing 26.

Furthermore, the first clutch element 4 is in the form of a pressure plate (also referred to as a counter-pressure plate) 17 of the decoupling clutch 6, which, as mentioned earlier, can be placed against the friction lining 24 of the second clutch element 5 from a first axial direction, which faces away from the clamping plate 20. In this case, the first pressure plate 17/the first clutch element 4 is of such solid design that it forms an inertial mass.

The torsional vibration damper unit 3 is positioned against the decoupling clutch 6 in the axial direction. Viewed in operation, the torsional vibration damper 3 is positioned in the power stream between an internal combustion engine 33, such as a diesel or gasoline engine, and the decoupling clutch 6.

The torsional vibration damper unit 3 is designed as a dual-mass flywheel 10. Besides a first flywheel, which is referred to as the secondary flywheel 11 of the dual-mass flywheel 10 and forms the flange section 7, the torsional vibration damper unit 3 has a second flywheel, which is referred to as the primary flywheel 12. The primary flywheel 12 is spring-pretensioned/elastically pretensioned in the direction of rotation relative to the secondary flywheel 11.

The primary flywheel 12 is formed to be connected non-rotatingly to a crankshaft of the internal combustion engine 33 when in operation. On a radially outer area of the primary flywheel 12, a disk-shaped base section 27 of the primary flywheel 12 transitions to an outer wall area 28 extending essentially in the axial direction. This outer wall area 28 extends in the axial direction beyond the flange section 7 in the direction of the decoupling clutch 6, so that the primary flywheel 12 simultaneously forms a housing 29 for the torsional vibration damper unit 3. To close the housing 29, at the outer wall area 28 a cover 30 extending radially inward a certain distance from the outer wall area 28 is joined to the primary flywheel 12. The cover 30 too, as a whole together with the primary flywheel 12, forms a side of the housing 29.

The secondary flywheel 12 and the flange section 7 formed thereon are positioned radially inside this housing 29. The flange section 7 is in fact essentially centered axially in the housing 29. Furthermore, the flange section 7 is essentially plate-shaped, and is supported so that it can rotate relative to the primary flywheel 12. The receiving space 9 is provided radially inside the flange section 7; this receiving space 9 is located on a side of the primary flywheel 12 facing the decoupling clutch 6. The receiving space 9 serves to receive the freewheeling unit 8, also referred to as the freewheeling mechanism.

The freewheeling unit 8 is designed as a typical freewheeling mechanism, and has an outer ring 13 as well as an inner ring 14, which are mounted so that they can rotate relative to each other by means of the roller bearing 16, which is in the form of a ball bearing. The outer ring 13 is attached directly to the flange section 7. The inner ring 14 is connected non-rotatingly to the shaft section 15 by means of a spline connection 32. Radially between the outer ring 13 and the inner ring 14 of the freewheeling unit 8 a plurality of locking elements are employed, distributed around the circumference (i.e., along an imaginary circumferential line running in a circle around the axis of rotation), which are not shown here in further detail in the interest of clarity. These locking elements act in such a way that when the outer ring 13 turns relative to the inner ring 14 in a first relative direction of rotation, the freewheeling unit is switched to a locked position, so that in this first relative direction of rotation the outer ring 13 is joined non-rotatingly with the inner ring 14. In a second relative direction of rotation, opposite to this first relative direction of rotation, these locking elements act in an unlocking position of the freewheeling unit 8 in such a way that the inner ring 14 and outer ring 13 are no longer joined to each other non-rotatingly, but are rotatable freely relative to each other, i.e., independently of each other.

The locked position is preferably selected when the internal combustion engine 33 is faster than an electric machine 31, which will be described later in connection with FIG. 2, so that the internal combustion engine 33 drives the shaft section 15. Consequently, the flange section 7 is joined non-rotatingly to the shaft section 15 in the first relative direction of rotation. In the second relative direction of rotation, no torque is transmitted from the torsional vibration damper unit 3 to the shaft section 15 when the decoupling clutch 6 is disengaged.

It can also be seen in FIG. 1 that the spline connection 32 is located radially between the inner ring 14 and the shaft section 15 to join the inner ring 14 non-rotatingly to the shaft section 15. In another version, this spline connection 32 is in the form of spline toothing/axial toothing. The shaft section 15 in turn projects far enough in the axial direction into the receiving space 9 and radially within the housing 29 so that the spline connection 32 is also located radially inside the housing 30. The shaft section 15 extends from this spline connection 32 in the axial direction to the second clutch element 5, which is located axially outside of the housing 29.

Besides the outer ring 13, the first clutch element 4 is also joined non-rotatingly to the flange section 7. The flange section 7, the outer ring 13 and the first clutch element 4 here each have an essentially disk-shaped connecting area/connecting point 19, which are in contact with each other and overlap in the axial direction and are firmly connected with each other. The first clutch element 4 extends in the axial direction from its connecting point 19, which is in contact with the disk-shaped connecting point 19 of the outer ring, to the second clutch element 5, and therefore out of the housing 30 in the axial direction.

Figure 2:
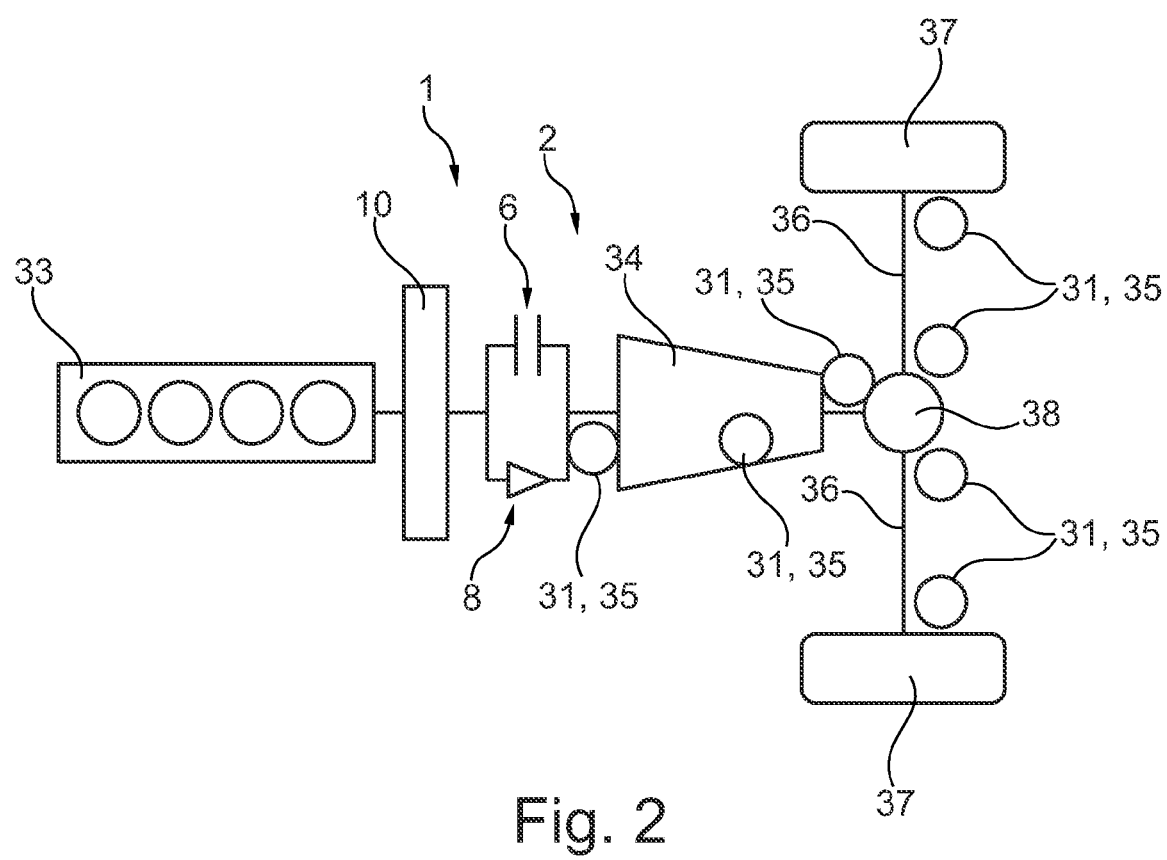

FIG. 2 in turn shows a schematic view of a drivetrain 2 according to the invention, in which the torque transfer device 1 according to the invention is employed. In this case, the torque transfer device 1 is situated between the internal combustion engine 33 and the transmission 34. In the interest of clarity, the torque transfer device 1 is depicted schematically. In addition, for easier comprehension, the dual-mass flywheel 10 and the decoupling clutch 6 and freewheeling unit 8 which adjoin it in the axial direction toward the transmission 34 are shown spaced apart, whereas these are constructed and function however according to the exemplary embodiment according to FIG. 1.

According to the various indicated positioning points 35, the electric machine 31 (also referred to as the electric motor) may be located in various positions due to the design of the torque transfer device 1. A first positioning point 35 of the electric machine 31 is chosen here in the axial direction between the decoupling clutch 6 and the transmission 34. It is also possible, however, to locate the electric machine 31 inside the transmission 34, namely inside the housing of the transmission 34. According to another embodiment, it is also possible to locate the electric machine 31 between the transmission 34 and a differential 38. In another embodiment, the electric machine 31 is also located on a drive shaft 36, which constitutes the output shaft of the differential 38. In this case, the electric machine 31 is located either at an end area of the drive shaft 36 facing the differential 38 or at an end area of the drive shaft 36 facing away from the differential 38, in the area of a wheel 37 (also referred to as a driving wheel of the motor vehicle). It is also possible to locate a plurality of such electric machines 31 simultaneously at at least some of the positioning points 35.

In other words, the combination of friction clutch (decoupling clutch 6) and freewheeling mechanism (freewheeling unit 8) according to the invention is positioned between the internal combustion engine 33/the DMF (dual/mass flywheel 10) and the transmission 34. In this case, it is possible to position the electric machine(s) 31 either between the clutch 6 and the transmission 34 (axially parallel or coaxially), in or on the transmission 34, behind the transmission 34, behind or on the differential 38, or on the wheel 37 (also possible for an axle not driven by an internal combustion engine 33). Additional arrangements, among others, are also imaginable in all-wheel-drive vehicles. The system DMF/freewheeling mechanism/friction clutch (torque transfer device 1) is designed with a dual/mass flywheel 10. Attached to the secondary side of the dual/mass flywheel 10 (flange) are both the inertial mass of the friction clutch 6 and the outer ring 13 of the freewheeling mechanism 8. The depicted friction clutch 6 is a "normally open" clutch, but in another embodiment the clutch 6 is also realized as a "normally closed" clutch. To actuate it, an engaging bearing (actuating bearing 23) is provided; an engaging system/actuating system/actuator (actuating device 21) is not shown in the interest of clarity. The inner ring 14 of the freewheeling mechanism 8 is connected to a shaft 15 by means of a spline connection 32. Alternatively, other positive-locking connections are also conceivable (for example axial toothing). The outer ring 13 of the freewheeling mechanism 8 is supported on the inner ring 14 of the freewheeling mechanism 8 by means of a bearing 16, in order to ensure clean centering of both components relative to each other. The clutching forces are transmitted to the shaft 15 through the same bearing. The shaft 15 itself is, for example, a transmission input shaft, and is additionally supported accordingly in the transmission housing.

REFERENCE LABELS

1 torque transfer device
2 drivetrain
3 torsional vibration damping unit
4 first clutch element
5 second clutch element
6 decoupling clutch
7 flange section
8 freewheeling unit
9 receiving space
10 dual/mass flywheel
11 secondary flywheel
12 primary flywheel
13 outer ring
14 inner ring
15 shaft section
16 roller bearing
17 pressure plate
18 clutch plate
19 connecting point
20 clamping plate
21 actuating device
22 lever element
23 actuating bearing
24 friction lining
25 connecting section
26 spline toothing
27 base section
28 outer wall area
29 housing
30 cover
31 electric machine
32 spline connection
33 internal combustion engine
34 transmission
35 positioning point
36 drive shaft 37 wheel
38 differential

What is claimed is:

1. A torque transfer device for a drivetrain of a motor vehicle, the torque transfer device comprising:
a torsional vibration damping unit and a decoupling clutch having first and second clutch elements joinable to each other, the torsional vibration damping unit including springs, the first clutch element being permanently connected non-rotatingly to a flange section of the torsional vibration damping unit such that the flange section is configured for transferring torque, transferred to the springs by an internal combustion engine, from the springs to the first clutch element, the second clutch element being coupled with the flange section via a freewheeling unit, at least some sections of the freewheeling unit being positioned in a radial receiving space of the torsional vibration damping unit, the freewheeling unit including a radial outer ring in the radial receiving space radially inside of the flange section.

2. The torque transfer device as recited in claim 1 wherein the torsional vibration damping unit is a dual mass flywheel.

3. The torque transfer device as recited in claim 2 wherein the flange section is part of a secondary flywheel of the dual mass flywheel.

4. The torque transfer device as recited in claim 1 wherein the radial outer ring of the freewheeling unit is attached non-rotatingly to the flange section or to the first clutch element.

5. The torque transfer device as recited in claim 1 wherein a radial inner ring of the freewheeling unit is connected non-rotatingly to the second clutch element via a shaft section extending out of the torsional vibration damping unit in an axial direction.

6. The torque transfer device as recited in claim 4 wherein the outer ring is supported radially relative to an inner ring of the freewheeling unit via a roller bearing.

7. The torque transfer device as recited in claim 5 wherein an outer ring of the freewheeling unit is supported radially relative to the inner ring via a roller bearing.

8. The torque transfer device as recited in claim 1 wherein the first clutch element is a pressure plate forming an inertial mass.

9. The torque transfer device as recited in claim 1 wherein the second clutch element is a clutch plate.

10. The torque transfer device as recited in claim 1 wherein the first clutch element extends in an axial direction into the torsional vibrating damping unit to a connecting point with the flange section.

11. The torque transfer device as recited in claim 1 wherein the decoupling clutch is a normally engaged or a normally disengaged clutch.

12. A torque transfer device for a drivetrain of a motor vehicle, the torque transfer device comprising:
a torsional vibration damping unit and a decoupling clutch having first and second clutch elements joinable to each other, the first clutch element being permanently connected non-rotatingly to a flange section of the torsional vibration damping unit and the second clutch element being coupled with the flange section via a freewheeling unit, at least some sections of the freewheeling unit being positioned in a radial receiving space of the torsional vibration damping unit, the first clutch element being a pressure plate fixed to the flange section at a connection, the second clutch element being a clutch plate for axially contacting the pressure plate, the pressure plate being axially between the flange section and the clutch plate, the clutch plate including an inner end configured for connecting to an outer surface of a transmission input shaft.

13. The torque transfer device as recited in claim 12 further comprising a movable clamping plate for axially contacting the clutch plate, the clutch plate being axially between the pressure plate and the clamping plate and configured for sliding radially outside of the transmission input shaft.

14. The torque transfer device as recited in claim 13 further comprising an actuator for forcing the clamping plate axially into the clutch plate to force the clutch plate into the pressure plate.

15. The torque transfer device as reciting in claim 12 wherein the freewheeling unit includes a radial outer ring, the radial outer ring being fixed to the flange section and the pressure plate at the connection.

16. A torque transfer device for a drivetrain of a motor vehicle, the torque transfer device comprising:
a torsional vibration damping unit and a decoupling clutch having first and second clutch elements joinable to each other, the first clutch element being permanently connected non-rotatingly to a flange section of the torsional vibration damping unit and the second clutch element being coupled with the flange section via a freewheeling unit, the freewheeling unit including a radial outer ring connected to the first clutch element and a radial inner ring configured for connecting to the second clutch element, the radial inner ring and the radial outer ring being positioned in a radial receiving space of the torsional vibration damping unit in radial alignment with the flange section, an inner circumference of the radial inner ring being configured for connecting to an outer surface of a transmission input shaft.

* * * * *